United States Patent [19]
von Elm et al.

[11] Patent Number: 6,038,241
[45] Date of Patent: Mar. 14, 2000

[54] PULSED-LASER WITH FIRST-PULSE CONTROL

[75] Inventors: Rudiger von Elm, Kuhren; Axel Kneip, Kiel, both of Germany

[73] Assignee: Coherent, Inc., Santa Clara, Calif.

[21] Appl. No.: 09/145,686

[22] Filed: Sep. 2, 1998

[30] Foreign Application Priority Data

Oct. 24, 1997 [DE] Germany .......................... 197 47 180

[51] Int. Cl.$^7$ ...................................................... H01S 3/13
[52] U.S. Cl. ................... 372/30; 372/25; 372/10
[58] Field of Search ................. 372/30, 25, 10, 372/29

[56] References Cited

U.S. PATENT DOCUMENTS

| | | | |
|---|---|---|---|
| 4,337,442 | 6/1982 | Mauck ........................................ | 372/29 |
| 4,412,330 | 10/1983 | Mauck et al. .............................. | 372/29 |
| 4,630,275 | 12/1986 | Rapoport .................................... | 372/13 |
| 5,225,051 | 7/1993 | Poa et al. ............................... | 204/64 R |
| 5,291,505 | 3/1994 | Nielsen ...................................... | 372/38 |
| 5,339,323 | 8/1994 | Hunter et al. .............................. | 372/25 |
| 5,812,569 | 9/1998 | Walker et al. ............................. | 372/30 |
| 5,982,790 | 11/1999 | Grossman et al. ........................ | 372/30 |

FOREIGN PATENT DOCUMENTS 1 601 355   10/1981   United Kingdom .

Primary Examiner—Leon Scott, Jr.
Attorney, Agent, or Firm—Limbach & Limbach L.L.P.

[57] ABSTRACT

A pulsed-laser includes a pump-light source, a gain-medium and a Q-switch. The Q-switch has an on-mode in which it is substantially transparent, and an off-mode in which it is normally substantially opaque. A gate-signal switches the laser between a ready-mode in which no pulses are delivered and a pulse-drive mode in which pulses are delivered. A first-pulse controller is provided for controlling the energy in the first of a series of pulses to be delivered by the laser. The first-pulse controller controls the first pulse energy by operating one or more of the Q-switch and the pump-light source in such a way that after switching from the ready-mode to the pulse drive mode the energy in the gain-medium at the instant of triggering the first pulse in the series of pulses is about the same that which will be reached in the gain-medium prior to triggering of subsequent pulses in the series. In this way, all pulses in the series have the about the same energy. Operation of the Q-switch may include raising its transmission value during its off-mode to allow a relatively low level of laser action for depleting energy stored in the gain-medium.

18 Claims, 9 Drawing Sheets

PULSED-LASER WITH FIRST-PULSE CONTROL

TECHNICAL FIELD OF THE INVENTION

The present invention relates generally to Q-switched pulsed-lasers. It relates in particular to a Q-switched laser including a pump-light source, a gain-medium and a Q-switch, wherein control of Q-switch transmissivity is used to control the energy of the first pulse in a series of pulses delivered by the laser.

DISCUSSION OF BACKGROUND ART

Pulsed-lasers can be switched between an inactive or "ready" operation mode and a pulse-drive operation mode by means of a gate or the like. In the inactive-mode the laser is held ready for use but does not deliver any laser radiation. Triggering the gate causes the laser to switch to the pulse-drive mode in which it can deliver an individual pulse or a series of pulses. In the ready-mode, the pump-light source keeps the gain-medium energized at a maximum (saturation) value. After the first pulse is switched, energy in the gain-medium is sharply depleted, generally almost to zero. Thereafter energy build up gain at a rate dependent on a characteristic time-constant of the gain-medium. If further pulses are delivered before the energy in the gain-medium has reached a value close to the maximum value, the result is a sawtooth-like temporal variation of the energy in the gain-medium, with peak values which are less than the maximum or saturation value. An effect of this is that the energy of the first pulse is increased over the energy of pulses which follow. The increase is greater the shorter the time-interval between pulses relative to the energizing time-constant of the gain-medium. This effect is undesirable in many applications of pulsed-lasers and can only be suppressed by controlling the first pulse in some way.

In U.S. Pat. No. 5,225,051 a pulsed-laser is disclosed in which the power of the pump-light source is reduced in the event that the time-interval between successive pulses exceeds a particular limiting value. In this way, the peak energy of the gain-medium is limited to a value about that which corresponds to the peak values in a continuing series of pulses.

A disadvantage of this prior-art pulsed-laser is that the pump-light source must be rapidly and precisely controlled over a wide range of power. Providing such control increases the technical complexity of the laser and, moreover, is only possible at all with certain types of pump-light source. In this prior-art laser, the pump-light source must be driven at a sharply reduced power. This can lead, with certain pump-light sources, to undesirable changes of properties of the pump-light source, for example, a change of wavelength in diode-laser pump-light sources. After a switch to pulse-drive mode, the pump-light source must first stabilize to a new drive-condition, whereby the first portion of a pulse-series or pulse-train delivered by the laser can be unstable.

There is a need to provide a pulsed-laser in which the energy of the first-delivered pulse of a series of pulses does not differ significantly from successive pulses in the pulse-series, while avoiding the disadvantage of the above-described, prior-art pulsed-laser.

SUMMARY OF THE INVENTION

The present invention is directed to overcoming above-discussed disadvantages of the above prior-art pulsed-laser. In one aspect, a pulsed-laser in accordance with the present invention includes a pump-light source, a gain-medium and a Q-switch. The Q-switch has an on-mode in which it is substantially transparent, and an off-mode in which it is normally substantially opaque. A gate-signal source cooperative with the Q-switch provides a gate-signal for switching the laser between a ready-mode and a pulse-drive mode. A first-pulse controller is provided for controlling the energy in the first of a series of pulses to be delivered by the laser.

The first-pulse controller is arranged to increase transmission of the Q-switch, at least periodically, to a limiting value at which pre-lasing of the laser can take place. The limiting transmission-value allows pre-lasing at an intensity such that, immediately before switching the laser from the ready-mode to the pulse-drive mode, energy in the gain-medium is limited to a level about equal to a peak-level which exists during the pulse drive-mode of the laser. The transmission of the Q-switch in its off-mode may be raised to the limiting value for an extended time-period, i.e., a time-period longer than a ready-mode time-period, or may be raised to the limiting value only during the ready-mode of the laser.

In another aspect of a pulsed-laser in accordance with the present invention, the pulse-energy and/or pulse-repetition frequency of the laser are selectively adjustable. The first-pulse controller is arranged such that the limiting value of Q-switch transmission is adjusted, dependent of the selected pulse-energy and pulse-repetition rate, to cause the pre-lasing to occur at an intensity such that the maximum energy in the gain-medium is limited to a value about that of a peak value which occurs during the pulse-drive mode at the selected pulse-energy and pulse-repetition rate.

In a prior-art Q-switched pulsed-laser, the Q-switch is normally switched back and forth between an on-mode, with maximum possible transmission, and an off-mode with minimum possible transmission. In preferred embodiments of a laser in accordance with the present invention, the Q-switch, in its off-mode, is controlled by a first-pulse controller such that the transmission of the Q-switch is at a value above the minimum possible value.

Above a certain (threshold) value of Q-switch transmission "pre-lasing" occurs, i.e., the laser begins to emit laser radiation at an intensity which is very low compared with the intensity during the laser-pulses which occur in the pulse-drive mode of the laser. During this pre-lasing, the intensity varies in isolated "spikes" or brief increases in intensity, which suddenly reduce the energy in the gain-medium. As intensity and/or duration of the pre-lasing is increased these sudden energy reductions are to ever-lower values.

In a first preferred embodiment of the present invention, by corresponding control of the Q-switch, the intensity of pre-lasing is adjusted such that the energy in the gain-medium is at about the peak level which exists during the pulse-drive mode of the laser.

An advantage of a pulsed-laser in accordance with the present invention is that, on triggering the first pulse of a pulse-series, about the same energy exists in the gain-medium as at the triggering of each of the subsequent pulses. Because of this, the energy of the first pulse is about the same as in subsequent pulses. The terminology "about the same" here means, dependent on accuracy requirements for pulse-energy control, a difference between successive pulses of between about ±0.5% and ±20%. From these values, the accuracy with which the energy in the gain-medium immediately before triggering the first pulse must agree with that (peak-energy) which exists during the pulse-series, is determined.

In a first embodiment of a laser in accordance with the present invention, a relatively minimal technical complexity is required, inasmuch as only the transmission of the Q-switch in its off-mode must be adjusted. This offers a further advantage in that no influencing of the pump-light source itself is necessary.

In such an embodiment, the increase in transmission of the Q-switch during its off-mode can be maintained constantly. A result of this is that pre-lasing takes-place during periods between emitted laser-pulses at a low intensity level compared with pulse-energy, and the time-constant for energizing the gain-medium is somewhat increased. This can be prevented by adjusting the Q-switch to a higher transmission only during the ready-mode of the laser. In this case, during the pulse-drive mode of the laser, the transmission of the Q-switch is adjusted to its minimum value.

If the pulse-repetition frequency or the pulse-energy of the laser is varied, the peak energy in the gain-medium reached during the pulse-series changes. Accordingly, in order that the energy of the first pulse of the pulse-series is again about the same as that of the subsequent pulses, the pre-lasing intensity must be correspondingly adjusted by a change in the transmission of the Q-switch during its off-mode. In another embodiment of a laser in accordance with the present invention, this (matching) adjustment is carried out automatically by the first-pulse controller.

In a simplest case of this embodiment, this matching adjustment can be achieved by a mechanical coupling of the adjustment controller for the appropriate parameters (Pulse-repetition frequency and/or pulse-energy; and pre-lasing intensity, e.g., Q-switch control parameters). Generally, however, electronic circuitry in analog or digital configurations or a combination thereof, is necessary. By way of example, an analog calculator circuit can determine the pre-lasing intensity for every value of pulse-repetition frequency and/or pulse-energy and control the Q-switch transmission accordingly. Alternatively, by way of example, the values of pre-lasing intensity corresponding to predetermined values of pulse-repetition frequency and/or pulse-energy can be entered in a digital memory, the correct control of the Q-switch being effected by selection of the corresponding memory addresses. For this purpose, for example, values of pulse-repetition frequency and/or pulse-energy can be digitalized and translated into a memory address.

In a variation of this embodiment of a laser in accordance with the present invention, a "single-shot" operation (repeated delivery of individual pulses) is possible without the energy of an individual pulse being increased compared with any other individual one of such pulses.

In a second embodiment of a laser in accordance with the present invention, wherein pre-lasing during the ready-mode of a pulsed-laser in accordance with the present invention is not desired, the Q-switch is adjusted for minimum-possible light-transmission during the ready-mode so that no pre-lasing takes place. After switching the pulsed-laser to pulse-drive mode, triggering of laser-pulses is next suppressed for a predetermined delay-period and the transmission of the Q-switch in its off-mode (in which it next remains) is increased, continually or in several steps, such that, through pre-lasing, the energy of the active laser material or gain-medium is reduced to about the same value as peak values which will occur in the subsequent pulse-series. The change of Q-switch transmission can not be effected suddenly, in a single step, as this would cause uncontrolled pulsing of the laser. After the predetermined delay time has expired, the transmission of the Q-switch in its off-mode is readjusted to its minimum-possible value and pulse triggering is allowed.

An advantage of this embodiment of a laser in accordance with the present invention over those previously described is that no pre-lasing takes place during the ready-mode of the laser. However, a delay-period between switching to the pulse-drive mode and actual triggering (delivery) of pulses must be taken into account. One the one hand, the faster the speed at which the transmission of the Q-switch in its off-mode is increased, the shorter this delay-period will be; on the other hand, however, the higher will be the pre-lasing intensity during the delay-period.

In this embodiment also, as with other above-described embodiments, the delay-period can be automatically matched with adjusted values of pulse-repetition frequency, pulse-energy and speed of increase in Q-switch transmission, such that, within the delay-period, the energy in the gain-medium is reduced about the same value as peak values which will occur during a subsequent pulse-series. In general, for this purpose, electronic control circuitry similar to that described above is necessary.

If pre-lasing is not desirable at any time, a third embodiment of a pulsed-laser in accordance with the present invention may be used. Here, the Q-switch is constantly controlled such that it has highest possible transmission in its on-mode and lowest possible transmission in its off-mode.

After switching the pulsed-laser to pulse-drive mode, triggering of laser-pulses is next suppressed for a predetermined delay-period. During this delay-period, the pump-light source is driven with pump-power reduced to a limiting value which is at least low enough that losses (for example through fluorescence) of the pulsed-laser exceed the pump-power and reduce the energy of the gain-medium. A delay-period is selected which is sufficiently long that, within the delay-period, the energy in the gain-medium is depleted to a value about that of the peak value of the pulses which will follow. After the delay-period has expired, the pump is increased to its normal value (typically full-power) and triggering of pulses is initiated. An advantage of this embodiment compared with other embodiments described above is that pre-lasing does not take place at any time.

In general, a limiting value of zero is chosen for pump-power reduction, such that the depletion of energy in the gain-medium as quickly as possible. For certain power supplies, it is preferable to select a non-zero limiting value for pump-power, so that the pump-light source remains continually in operation.

As an alternative to the last-described procedure, the delay-period can also be selected to be sufficiently long that, within this delay-period, the energy in the gain-medium is depleted to about zero. Depending on the requirement for agreement between the energy of the first pulse with the corresponding of the subsequent pulses in a pulse-series, this means to a value between from about 20% to less than about 1% of the maximum or saturation energy value. The first trigger-signal for triggering a laser-pulse is initiated with at a time-interval from the end of the delay-period which is the same as the interval between pulses (temporal pulse-separation) in the series. In this way, the energy condition of the gain-medium at the triggering of the first pulse of the series is about the same as that at the triggering of the subsequent pulses, accordingly the energy of the pulses is almost equal.

In a fourth embodiment of a pulsed-laser in accordance with the present invention (a combination of above described embodiments), the transmission of the Q-switch is increased, continuously or in steps, during a delay-period for switching to pulse-drive mode. This delay-period has a length which is either predetermined, or determined by the first-pulse controller in accordance with selected pulse-repetition frequency and pulse-energy, such that pre-lasing takes place. Additionally, during this delay-period, the pump-power is reduced to a limiting value, (generally zero). As a result of this, the energy in the gain-medium is depleted significantly faster than would be the case through pre-lasing or pump-power reduction alone, and the delay-period correspondingly can be selected to be very short. After the end of the delay-period, pump-power is restored to its normal value (in general, full power) and laser-pulses are triggered.

As described above for other embodiments, in this embodiment and its alternatives, the delay-period and pump-power limiting values can be automatically adapted for adjusted values of pulse-repetition frequency, such that, within the delay-period, the energy in the gain-medium is depleted to about that value which will be the peak value in a subsequent pulse-series (correspondingly, in this alternative embodiment the energy is deleted to about zero). Typically for this purpose, electronic circuitry similar to that described above is required.

In a fifth embodiment of a pulsed-laser in accordance with the present invention, the first-pulse controller is arranged such that, after switching the pulsed-laser to the pulse-drive mode, in a first time-interval the energy in the gain-medium is depleted to a start-value which corresponds to a value which would provide continuous laser activity. In a subsequent, second time-interval, the energy is depleted to a value which corresponds to the peak value which is reached during a pulse-series. After the second time-interval, pulses are triggered.

In accordance with principles of the present invention, energy in the gain-medium, during the first time-interval, is reduced through pre-lasing by corresponding operation of the Q-switch. The energy is reduced to a value corresponding to a value that the gain-medium would reach in continuous (CW) laser operation (therefore no pulsed-operation). Once this value is reached, the laser radiation stabilizes and spikes rarely occur. If a longer first time-interval than is necessary to reach the start-value (within about 5%) is selected, the intensity stabilizes even further and the start-value is better defined. As a result, the energy value reached in the second time-interval corresponds more exactly to the peak value which is reached during a pulse-series, and the energy of the first pulse in a series corresponds better with the energy of subsequent pulses in the series.

Alternatively, the depletion of energy during the first time-interval can be achieved through reducing the pump-power during the entire first time-interval or part thereof. Pump-power may be reduced by between about 10% and 100%. A combination of pre-lasing and reduction of pump-power is also possible. Continuing from the start-value, in a subsequent, second time-interval the energy in the gain-medium is depleted to a value which corresponds to the peak value which is reached during pulse-drive mode and pulses are delivered.

An advantage of this fifth embodiment of the inventive pulsed-laser and alternatives thereof is that on triggering the first pulse of a pulse-series, the energy in the gain-medium lies at a value about that at which it will lie at the triggering of subsequent pulses. As the depletion of energy in the gain-medium takes place from a start-value, it is possible to deplete the energy in the gain-medium on triggering the first pulse to a very precise value. According the energy in the first pulse is almost equal to the energy in subsequent pulses. By almost equal, here, is meant a difference in energy between the first and subsequent pulses of about ±0.5% and ±20%, depending on the accuracy requirements for the pulse-energy. From these values is determined the accuracy with which the depletion of the energy in the gain-medium immediately before triggering the first pulse must agree with that which is in the gain-medium before the triggering of the subsequent pulses.

The technical complexity in a simplest such embodiment is very small, as only two fixed time-intervals need be provided: a first, in which the energy in the gain-medium is depleted, and a second, in which the energy in the gain-medium is further depleted and the length of which is about 80% of the time-interval between pulses. It is further advantageous that no influencing of the pump-source is necessary if the depletion of the energy in the gain-medium takes place entirely through pre-lasing.

If the pulse-repetition rate and/or pulse-energy are changed, (correspondingly, the pump-power is varied) the peak energy in the gain-medium during the emitted pulse-series is changed. In order that the energy of the first pulse of the pulse-series again is about equal to the energy of subsequent pulses in the series, the length of the second time-interval, must be matched, in higher requirements of accuracy of pulse-energy, to the changed parameters.

In a simplest case, the time-interval is adjusted manually. In a further inventive arrangement, the matching is carried out automatically by the first-pulse controller. In a simplest case, this can be effected by a mechanical coupling of the adjustment controller for the particular parameter (pulse-repetition rate and/or pulse-energy, correspondingly, pump-power). Generally, however, electronic circuitry in digital or analog form (or a combination of analog and digital) is necessary.

By way of example, an analog circuit can be used to determine the necessary length of the second time-interval for each value of pulse-repetition rate and/or pulse-energy (and correspondingly, pump-power), and to control the Q-switch accordingly. Values of the second time-interval corresponding to particular values of pulse-repetition rate and/or pulse-energy (and correspondingly, pump-power) can be stored in a digital memory. Correct control of the Q-switch occurs then through the selection of the corresponding memory cell. To this end, the values of pulse-repetition rate and/or pulse-energy, and correspondingly, pump-power can be digitalized and translated into memory addresses.

If the sum of the first and second time-intervals is adjusted to a fixed value, this provides an advantage that the delay-time between switching the laser to pulse-drive mode using the gate-signal and the emission of the first pulse is exactly known and independent of the adjusted parameters. In order to adjust the sum of the first and second time-intervals to a fixed value, the length of the first time-interval, which is only required not to undershoot a certain minimum value but otherwise is not critical, can be correspondingly adapted.

In a sixth embodiment of a pulsed-laser in accordance with the present invention, the energy of the first and subsequent pulses of a pulse-series is matched, in that the energy level in the gain-medium at the instant of switching the pulsed-laser to the pulse-drive mode is only partly depleted to the form of the first pulse (or first pulses). To this end, from the moment of switching the pulsed-laser to the pulse-drive mode, for a predetermined period the transmission of the Q-switch in its on-mode is not at its maximum transmission but is adjusted to a limiting transmission, which is reduced compared to the maximum transmission. Because of this, the onset of laser activity occurs at a reduced power compared with normal pulse-drive operation, and the first-emitted laser-pulse receives an energy less than the maximum possible energy. The limiting transmission is selected such that the energy in the first pulse corresponds to about the energy of laser-pulses of pulse-series in its stable condition. Through this first pulse, the energy in the gain-medium is depleted. Typically it is depleted to a value which is greater than the peak value which will exist in normal pulse-drive mode. Because of this, it is necessary there must be a second, and eventually a third pulse emitted, with the Q-switch, in its on-mode, controlled at a limiting transmission value. Here, the limiting transmission is at a higher level than at the first pulse, as the energy in the gain-medium has already been reduced. The predetermined time ends after emission of the second or third pulses. An advantage of this embodiment is that no pre-lasing takes place and also there is no delay between switching the pulsed-laser to its pulse-drive mode and the emission of pulses.

As with other above-described embodiments of a laser in accordance with the present invention, it is also possible, by means of an electronic circuit similar to those described above, to automatically select the predetermined time-period and the limiting transmission, dependent on adjusted values of the pulse repetition-rate, such that the first pulse of a pulse-series contains about the same energy as every further pulse of this pulse-series.

In the pulse-drive mode, the pulsed-laser outputs more energy than during the ready-mode. Because of this the temperature of the gain-medium rises compared with the temperature during the pulse-drive mode. This can effect undesirable changes in the properties of the inventive pulsed-laser. In order to avoid, or at least reduce, such undesirable changes, a seventh embodiment of a pulsed laser in accordance with the present invention is contemplated, in which pump-power of the pump-source during the ready-mode of the pulsed-laser can be reduced. This embodiment may be implemented as a variation of all other above-described embodiments of the inventive pulsed-laser. In this embodiment, the pump-power may be reduced to a value at which the energy-balance of the pulsed-laser during the ready-mode is a close as possible to the energy-balance during the pulse-drive mode. The necessary pump-power depends on properties of the pulsed-laser and on selected values of pulse-repetition frequency and pulse-energy. Typical values are between about 50% and 95% of full pump-power.

Principles of the present invention are applicable to all types of Q-switched lasers (for example, gas-lasers, solid-state lasers, dye-lasers and excimer-lasers) with all possible pump-sources (for example, flashlamps, CW lamps, light-emitting diodes, lasers, diode-lasers, and gas-discharges). Only in relatively few of the above described embodiments is it necessary for the power of the pump-source to be variable. In these few embodiments, it is not absolutely necessary for the laser to be equipped with a Q-switch.

A fundamental principle of the present invention is to control the amount of energy in the gain-medium for the first pulse of a pulse-series such that only a partial amount of the maximum or saturation amount is depleted. This can be realized on the one hand in that, if before emission of the first pulse, the gain-medium is energized up to the maximum value, this value is somewhat depleted before the triggering of the first pulse takes place. On the other hand, however, the emission of the first pulse can be controlled such that, beginning from a maximum value, only a partial amount of energy is depleted, whereby at the end of the first pulse there is a residual amount of energy remaining in the gain-medium.

The Q-switch can be arranged as an acousto-optic switch. Such a switch comprises an optical material transparent for the laser-radiation, in which an ultrasonic wave is created with the assistance of a piezo-electric crystal excited to oscillation by a high-frequency voltage. Because of the photo-elastic effect, localized changes in the refractive index of the optical material are induced creating in effect a "phase-grating". The period of the thus-created phase-grating is identical to the acoustic (ultrasonic) wavelength, and the amplitude is proportional to the ultrasonic amplitude. If an optical element of this kind is inserted in a laser resonator, a portion of the optical wave in the resonator leaves the resonator, i.e., is lost, through diffraction at the phase-grating. If the ultrasonic amplitude, i.e., the high-frequency voltage, is sufficiently great, these additional losses are sufficient to impede laser oscillation, and the Q-switch is then in its off-mode. By turning off the high-frequency voltage (turning the Q-switch to its on-mode) the laser resonator is immediately transformed to a high quality (high-Q) condition and a laser-pulse is emitted.

If the high-frequency potential is reduced, starting from its full value, the ultrasonic amplitude falls and the effectiveness of the diversion of light from the resonator falls therewith, i.e, a smaller portion of the light leaves the resonator. Below a certain high-frequency potential, there is an onset of pre-lasing. Over and above the high-frequency potential, the light-diverting effectiveness of the piezo-electric element can be influenced by the frequency of the high-frequency potential applied thereto, in that the piezo-electric element, at an exciting-frequency that does not correspond to its resonance-frequency, works less effectively.

The Q-switch can also arranged as an optical switch based of the Pockels effect or the Kerr effect. In the Pockels effect, light is directed through a crystal, for example KDP, which becomes doubly-refracting when an electrical field is applied thereto. In the Kerr effect, instead of a crystal, a cell containing a fluid such as nitrobenzol, the molecules of which are anisotropic, is used. In both cases, when combined with a polarizer, an optical switch results, the transmissivity of which is controllable by the level of the applied electrical field.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

DETAILED DESCRIPTION OF THE INVENTION

Figure 1:
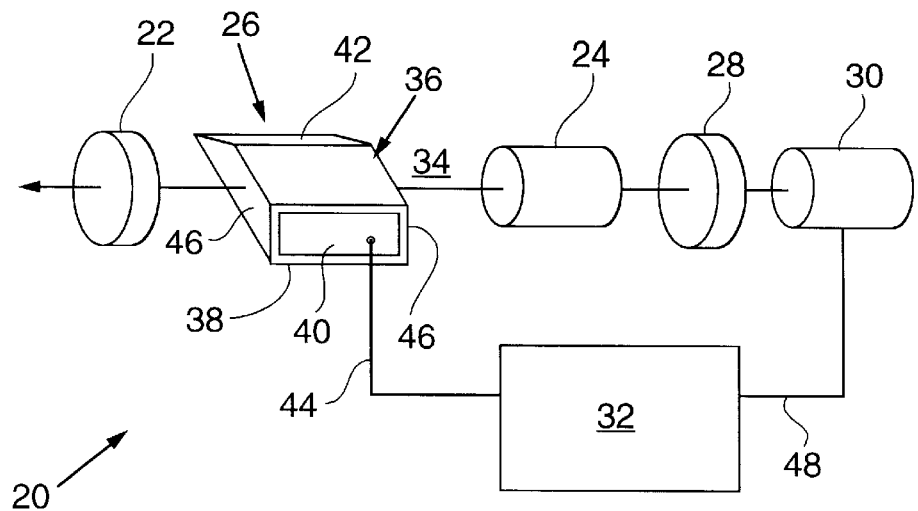
FIG. 1 is a perspective view schematically illustrating one preferred arrangement of a pulsed-laser in accordance with the present invention, including a diode-laser pump-source, a Q-switch and a first-pulse controller, cooperative with the diode-laser and the Q-switch.

Turning now to the drawings, wherein like features are illustrated by like reference numerals, FIG. 1 depicts one arrangement 20 of a pulsed-laser in accordance with the present invention. Pulsed-laser 20 comprises an outcoupling mirror 22, a gain-medium 24, for example an Nd:YAG crystal, a Q-switch 26, an incoupling mirror 28, a diode-laser (pump-source or pump-light source) 30, and a first-pulse controller 32. Components 22, 24, 26, and 28 form a laser resonator 34, which is end-pumped (longitudinally-pumped) through incoupling mirror 28 by diode-laser 30.

Q-switch 26 is arranged as an acousto-optic switch and comprises a glass-block 36 on a lateral surface 38 of which a piezo-electric element 40 is mounted. An opposite, lateral surface 42 of glass-block 36 slopes towards surface 38. When a high-frequency potential is applied to piezo-electric element 40 via lead 44, high frequency sound-waves are created in glass block 36 and are quenched by sloping surface 42 thereof. The sound-waves act as a phase-grating and divert light which is directed through end faces 46 of glass block 36. Q-switch 26 has an on-mode in which it is not supplied with high-frequency potential and does not divert light. Q-switch has an off-mode in which it is supplied with high-frequency potential at full amplitude and causes maximum diversion of light. The optical components of the laser are aligned such that, in the on-mode of Q-switch 26, laser-action is possible. In the off-mode of Q-switch 26, light in resonator 34 is diverted so far that no laser-action is possible.

Pulsed-laser 20 functions as follows. Beginning with Q-switch 26 in its off-mode, gain-medium 24 is energized to saturation through the power of pump-source 30. If Q-switch 26 is rapidly switched into its on-mode, laser action is initiated and a laser-pulse is emitted. As a result, energy in the gain-medium is reduced to zero, or at least almost to zero. Thereafter, the gain-medium re-energizes according to a certain time-constant and a further laser-pulse can be emitted.

Figure 2:
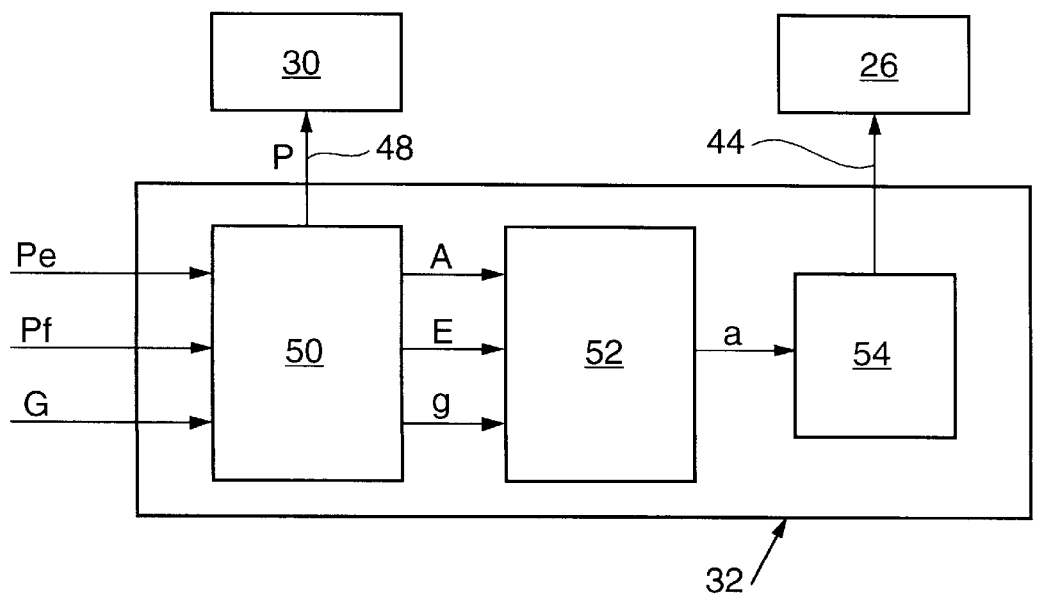
FIG. 2 is a circuit block diagram schematically illustrating details of components and signals of the first- pulse controller of FIG. 1.

Referring now to FIG. 2, one preferred arrangement of first-pulse controller 32 is illustrated. First-pulse controller 32 is connected with Q-switch 26 via lead 44, and connected with diode-laser 30 via a lead 48. Controller 32 includes computer circuitry 50, a gate 52, and a high-frequency generator (HF-generator) 54 which supplies Q-switch 26 via lead 44. Input signals for computer circuitry 50 are a signal Pe for selected pulse-energy, a signal Pf for selected pulse repetition frequency, and a digital gate-signal G which switches between the ready-mode and pulse-drive mode of pulsed-laser 20.

A signal P from computer circuitry 50 goes to pump-source 30 and influences its power. Influence by signal P on emitted pulse-energy, among other parameters, is also possible. Computer circuitry 50 also delivers a signal A, which sets the HF amplitude of HF-generator 54 in the off-mode of Q-switch 26, a signal E, which sets the HF amplitude of HF-generator 54 in the on-mode of Q-switch 26, and a digital signal g. These three signals go to gate 52, at the output of which a signal a is delivered. Signal a sets the amplitude of the HF-potential generated by HF-generator 54, and thereby controls the diversion behavior of Q-switch 26. Signal g switches signal a back and forth between the values A and E.

In computer circuitry 50, a mathematical relationship between input signals Pe, Pf and G and output signals P, A, E and g is established, for example, with analog circuitry. The form of the mathematical relationship depends on the properties of the pulsed-laser and the selected embodiment of the present invention.

Figure 3:
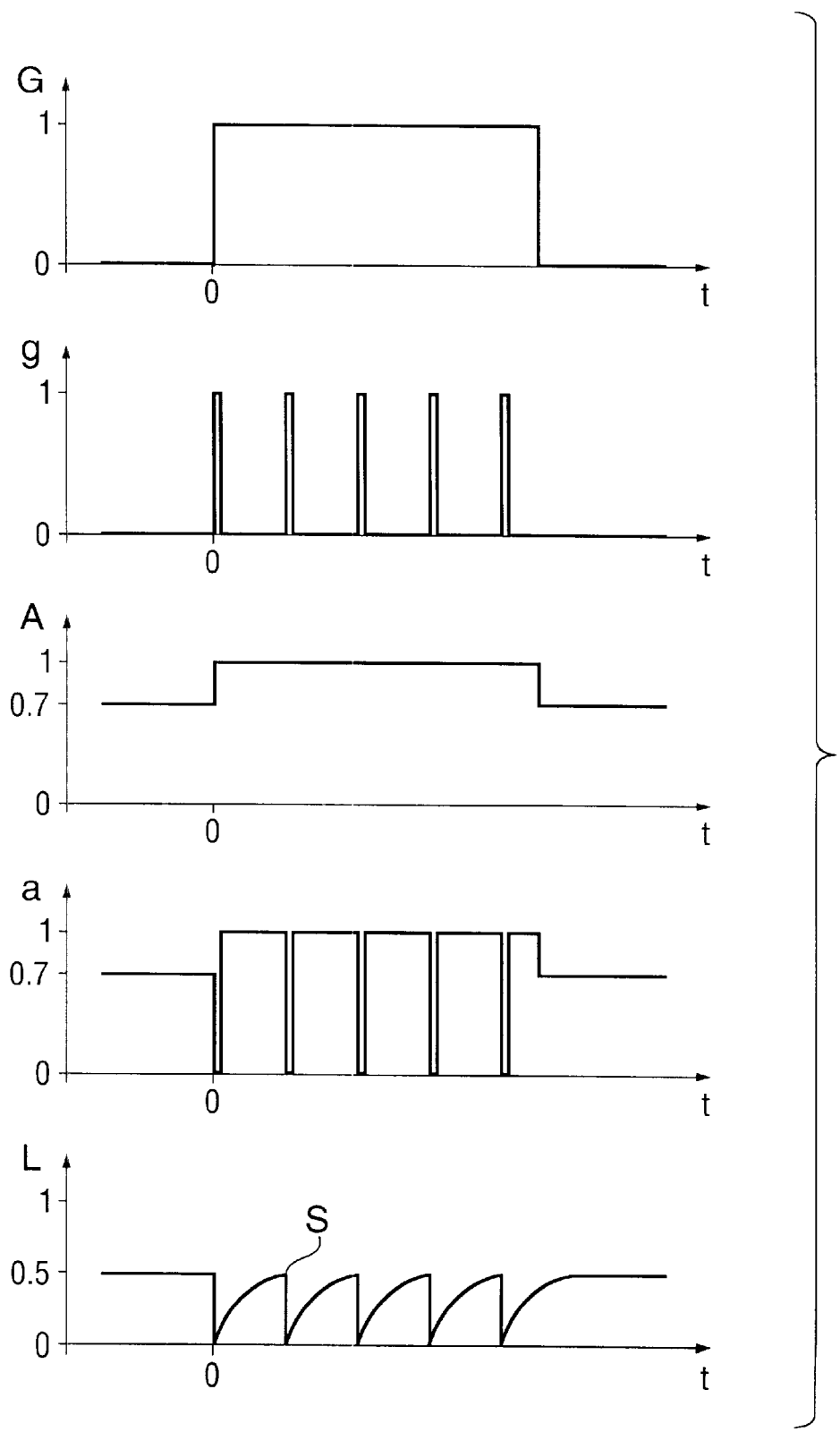
FIG. 3 is a timing diagram graphically, schematically illustrating the relationship of control signals of the first-pulse controller of FIG. 2 in a first embodiment of the present invention.

Referring now to FIG. 3, the temporal relationship of signals G, g, A and a and the energy L of gain-medium 24 in the first embodiment of the inventive pulsed-laser is depicted in superposed graphs. Here, signal E (not shown) is constantly at zero. In each graph, the horizontal axis represents time and the corresponding signal, normalized to unity, is shown on the vertical axis. Digital signal G can be externally switched back and forth between conditions 1 and 0, wherein 0 and 1 respectively mean ready-mode operation and pulse-drive mode operation of laser 20. Time t=0 is set as the instant of switching from ready-mode to pulse-drive mode. Individual laser-pulses are triggered by the rising-edges of signal g. The temporal separation of pulses is set by input signal Pf. Signals G and g are interrelated such that g is always 0 when G is 0, and g delivers pulses when G=1. While G=0, computer circuitry 50 sets a value for signal A, for example A=0.7, and while G=1 the value is set at A=1. The value of E here is always E=0. Gate 52 links signals A, E and g with each other such that while g=0, signal A=a, and while g=1, signal A=E.

The temporal relationship of the signals is as follows. While G=0, a=0.7 and while G=1, a switches between 0 and 1 at the pulse-repetition frequency set by Pf. If signal a=1, Q-switch 26 is controlled with maximum HF-amplitude and laser-action is not possible in resonator 34 because of the maximum diversion of light therefrom. If a is switched to 0, the light diversion becomes zero and a laser-pulse is delivered. If a=0.7, pre-lasing takes place at a predetermined power on account of the partial diversion of light. This power is selected by computer circuitry 50 such that the energy L in gain-medium 24 during the ready-mode of pulsed-laser 20 corresponds, within set tolerances, to the peak value S which will occur during the pulse-drive mode of pulsed-laser 20.

The temporal progress of energy L in gain-medium 24 is as follows. During the ready-mode of pulsed-laser 20, energy L is maintained, through pre-lasing, at some constant value, for example 0.5 (where 1 corresponds to full or saturation energy). With the first falling-edge of signal a, the first pulse of a pulse-series is delivered. As a result, the energy falls very quickly to 0. Through the supply of pump-energy the energy in the gain-medium builds up with a certain time-constant. The next falling-edge of signal a releases the next pulse. At this instant, the energy L had risen to the peak value S which was reached in the pulse-drive mode. The delivered pulse depletes energy L again to 0, and the forgoing procedure is repeated until pulsed-laser 20 is once again switched to the ready-mode. The energy then rises to the value 0.5 determined by pre-lasing and remains at this value. As the energy during the ready-mode of pulsed-laser 20 has about the value S, the first pulse contains about the same energy as each of the subsequent pulses.

If other values for pulse-energy Pe and pulse-repetition frequency Pf are selected, the peak energy value S changes accordingly. computer circuitry 14 then adapts the value of A for the upcoming G=0 period such that, during the ready-mode of the pulsed-laser 20, it matches again, within set tolerances, with the new value of S, whereby all pulses in a pulse-series contain about the same energy.

Figure 4:
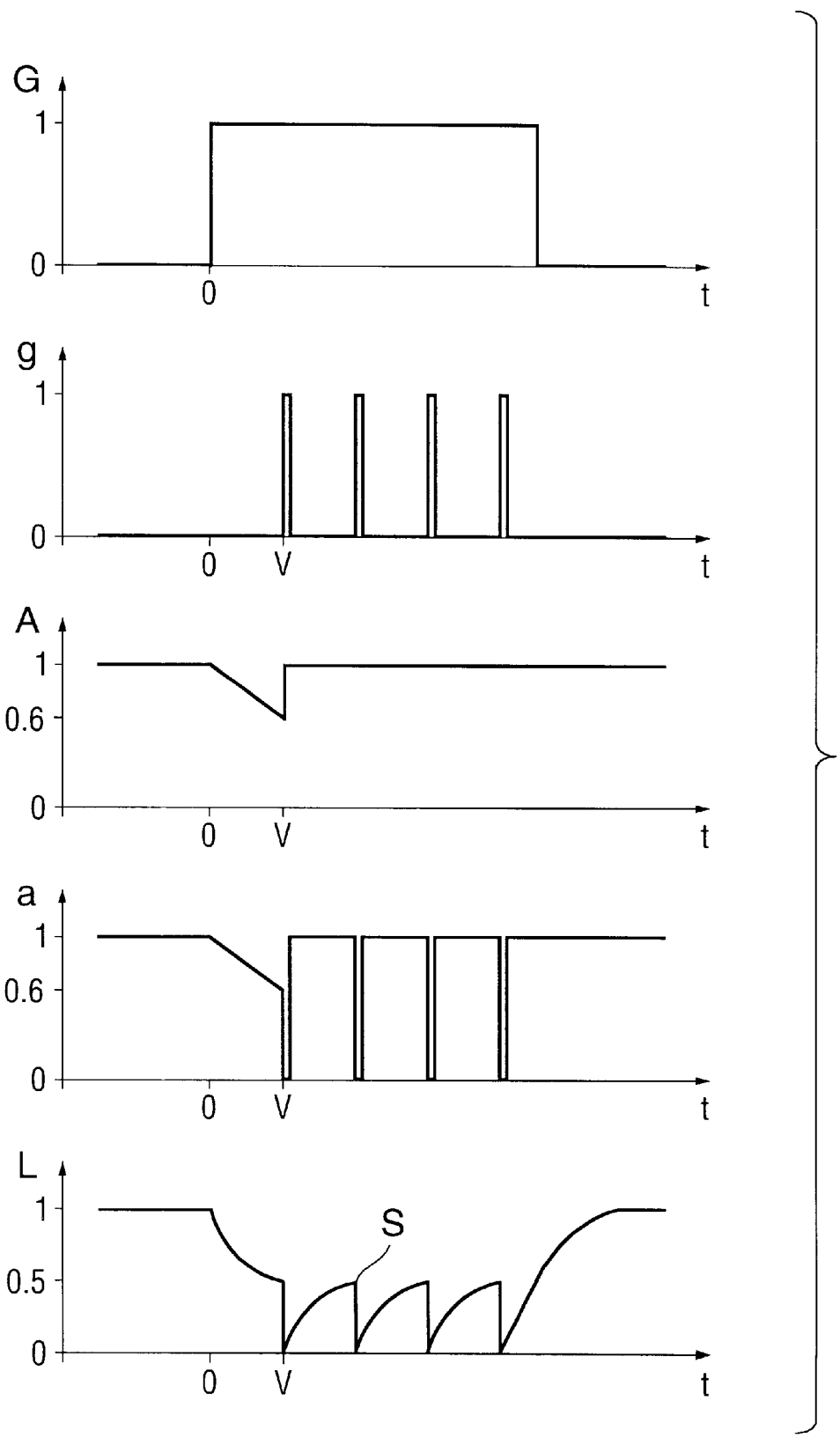
FIG. 4 is a timing diagram graphically, schematically illustrating the relationship of control signals of the first-pulse controller of FIG. 2 in a second embodiment of the present invention.

Referring now to FIG. 4, the temporal relationship of signals G, g, A and a and the energy L of gain-medium 24 in the second embodiment of the inventive pulsed-laser is depicted in superposed graphs. Here again, signal E (not shown) is constantly at zero. After switching from the ready-mode (G=0) to the pulse-drive mode (G=1), computer circuitry 50 delays the first pulse of signal g by a delay-time V. During delay-time V, signal A is continuously reduced from 1 to, for example, 0.6, and after the expiration of delay-time V again back to 1. Signal a, which is 1 during the ready-mode, reduces from 1 to 0.6 during delay-time V, and switches back and forth between 1 and 0 during the remaining pulse-drive mode time. Energy L is 1 during the ready-mode, i.e., the gain-medium is energized to saturation. During delay-time V, L reduces, and at the end of delay time V has reached the above-exemplified value of 0.5. During the delivery of laser-pulses, L fluctuates between 0 and the peak value S=0.5. After switching again to the inactive-mode, L builds up again to 1.0.

Figure 5:
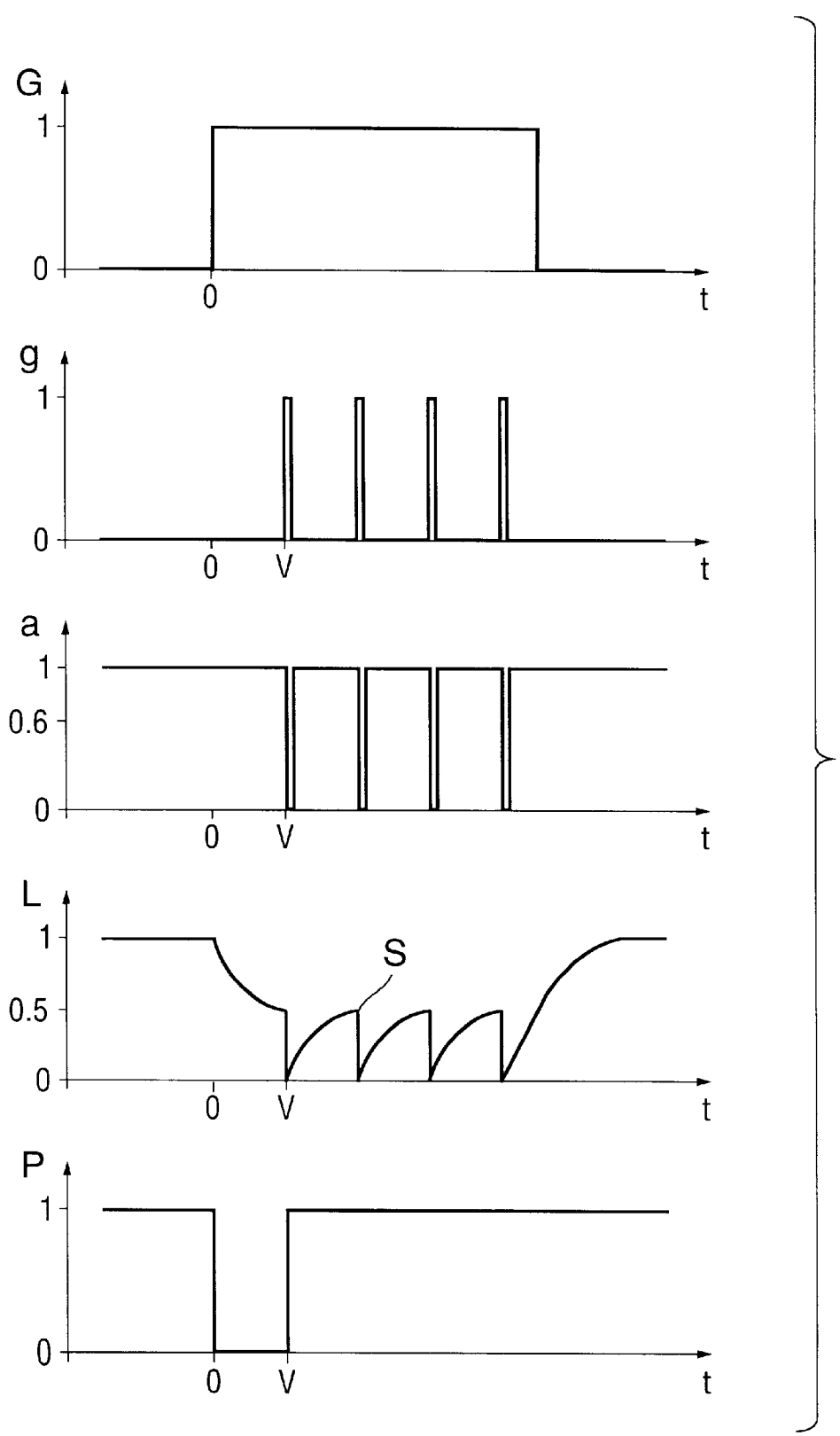
FIG. 5 is a timing diagram graphically, schematically illustrating the relationship of control signals of the first-pulse controller of FIG. 2 in a third embodiment of the present invention.

Referring now to FIG. 5, the temporal relationship of signals G, g, a and P and the energy L of gain-medium 24 in the third embodiment of the inventive pulsed-laser is depicted in superposed graphs. Here, signal A is constantly at 1 and signal E is at 0. Neither signal is shown in FIG. 5. Pump-power P of pump-source 30 is adjusted to a maximum value during the ready-mode of pulsed-laser 20. At the instant of switching to the pulse-drive mode at t=0, the pump-power is reduced to 0 for a delay-time V. As a result of resonator losses, the energy in gain-medium 24 falls progressively during delay-time V from its maximum value and reaches, at t=V, a value of about 0.5 (again, by way of example) which also corresponds with the peak value S during the pulse-drive mode. After t=V, laser-pulses are triggered (signal g) and the pump-power is again raised to its initial value. After switching to the ready-mode, L builds up again to 1.

Figure 6:
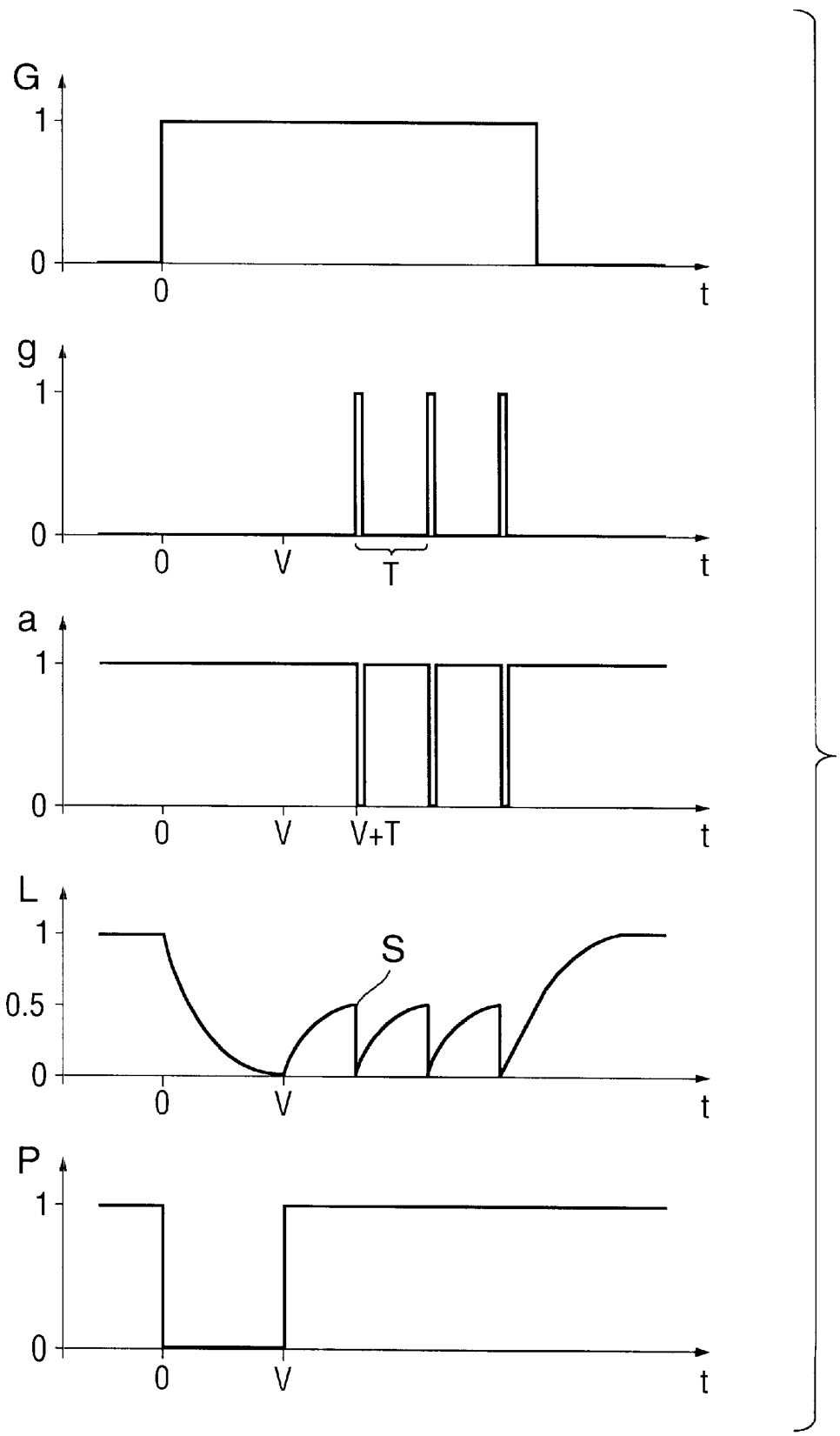
FIG. 6 is a timing diagram graphically, schematically illustrating the relationship of control signals of the first-pulse controller of FIG. 2 in a fourth embodiment of the present invention.

Referring now to FIG. 6, the temporal relationship of signals G, g, a and P and the energy L of gain-medium 24 in the fourth embodiment of the inventive pulsed-laser is depicted in superposed graphs. Here again, signal A is constantly at 1 and signal E is at 0. Neither signal is shown in FIG. 6. Pump-power P of pump-source 30 is set to a maximum during the ready-mode of pulsed-laser 20. At the instant of switching to the pulse-drive mode at t=0 the pump-power is reduced to zero for a delay-time V. Delay time V is selected to be sufficiently long that the energy in gain-medium 24 has fallen to zero before t=V. The first laser-pulse is initiated at time V+T, where T is the temporal separation of pulses in a pulse-series. As the energy builds up progressively from zero during time T, at the delivery of the first laser-pulse there is the same energy in the gain-medium as there will be at the delivery of the remaining laser-pulses, whereby all pulses contain the same energy.

Figure 7:
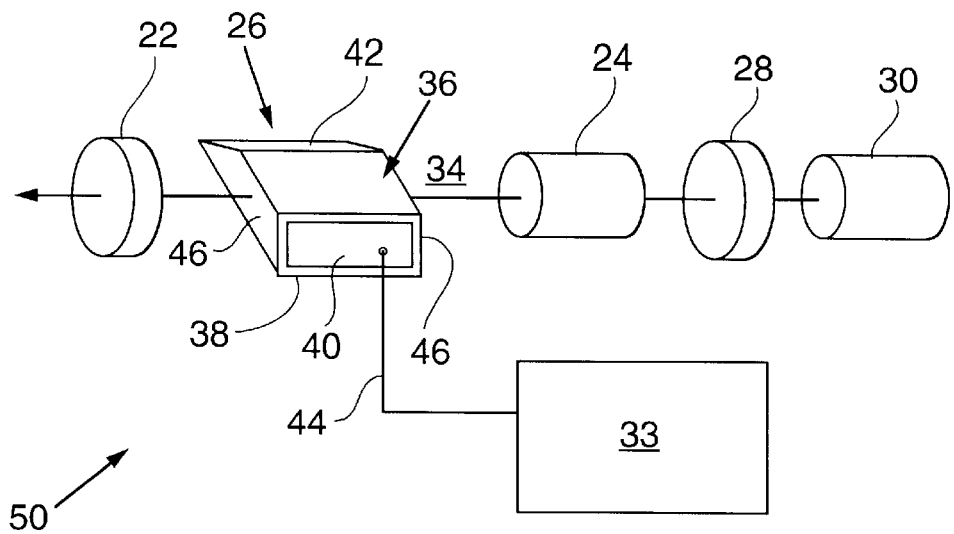
FIG. 7 is a perspective view schematically illustrating another preferred arrangement of a pulsed-laser in accordance with the present invention, including a diode-laser pump-source, a Q-switch and a first-pulse controller, cooperative with the diode-laser and the Q-switch.

In FIG. 7 is depicted another arrangement 50 of a pulsed-laser in accordance with the present invention. Pulsed-laser 50 is similar to pulsed-laser 20, with the exception that a different first-pulse controller 33 replaces first-pulse controller 32, and there is no lead 48 connecting the first-pulse controller with pump-source 30. An eventual influence of pump-source 30 occurs in this arrangement via a separate signal-lead not shown in FIG. 7.

Figure 8:
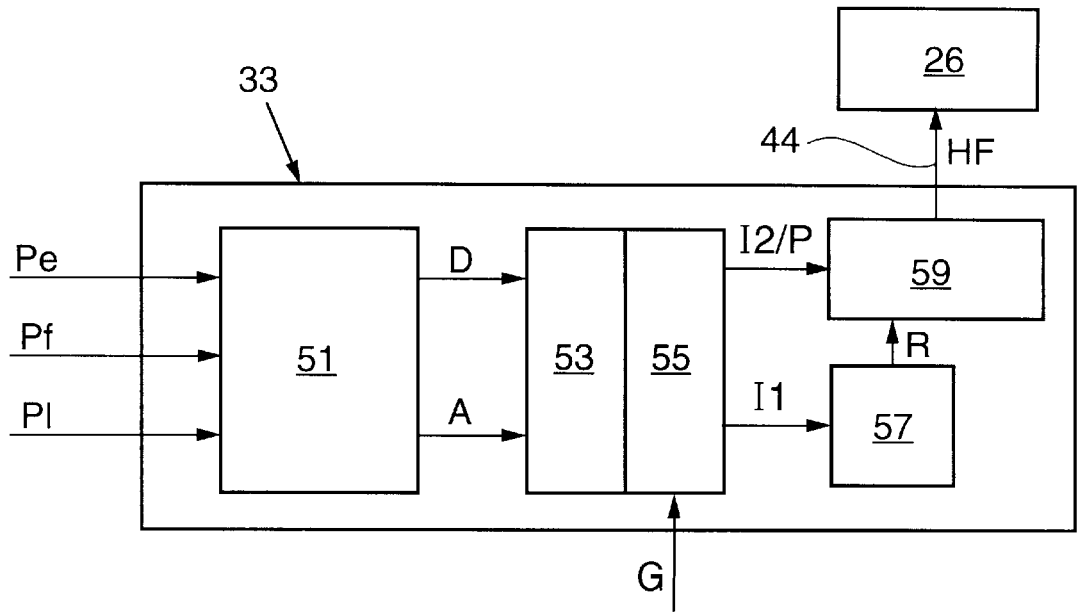
FIG. 8 is a circuit block diagram schematically illustrating details of components and signals of the first-pulse controller of FIG. 7.

In FIG. 8 is depicted the arrangement of first-pulse controller 33 which is connected to Q-switch 26 via lead 44. First-pulse controller 33 comprises computer circuitry 51, random access memory (RAM) 53, a timer 55 an integrator 57 and an HF generator 59 which supplies Q-switch 26 via lead 44.

Input signals for computer circuitry 51 are a signal Pe for selected pulse-energy, a signal Pf for selected pulse repetition frequency, and a signal P1 for the selected pump-power. Computer circuitry 51 and RAM 53 are connected by a data-lead (bus) D and an address-lead A. Data required by timer 55 for the duration of above-discussed first and second time-intervals and for the pulse-repetition frequency are stored in RAM 53, and are activated by a change in input signals Pe, Pf or P1.

Timer 55 has as an input signal a gate-signal G which changes from 0 to 1 when pulsed-laser 50 is switched from the ready-mode to the pulse-drive mode. During the first time-interval, the timer delivers a signal I1 to integrator 57. Integrator 57 on its part, during the first time-interval, delivers a ramp-like signal R to HF-generator 59. Ramp-like signal R has the effect that the transmissivity of Q-switch 26 increases continually during the first time-interval. As a result of this, the energy in gain-medium 24 is depleted by pre-lasing. Output signal I2/P is zero during the second time-interval. Thereafter, short pulses with a temporal separation T corresponding to the selected pulse-repetition frequency are created. These serve for triggering the laser-pulses.

Figure 9:
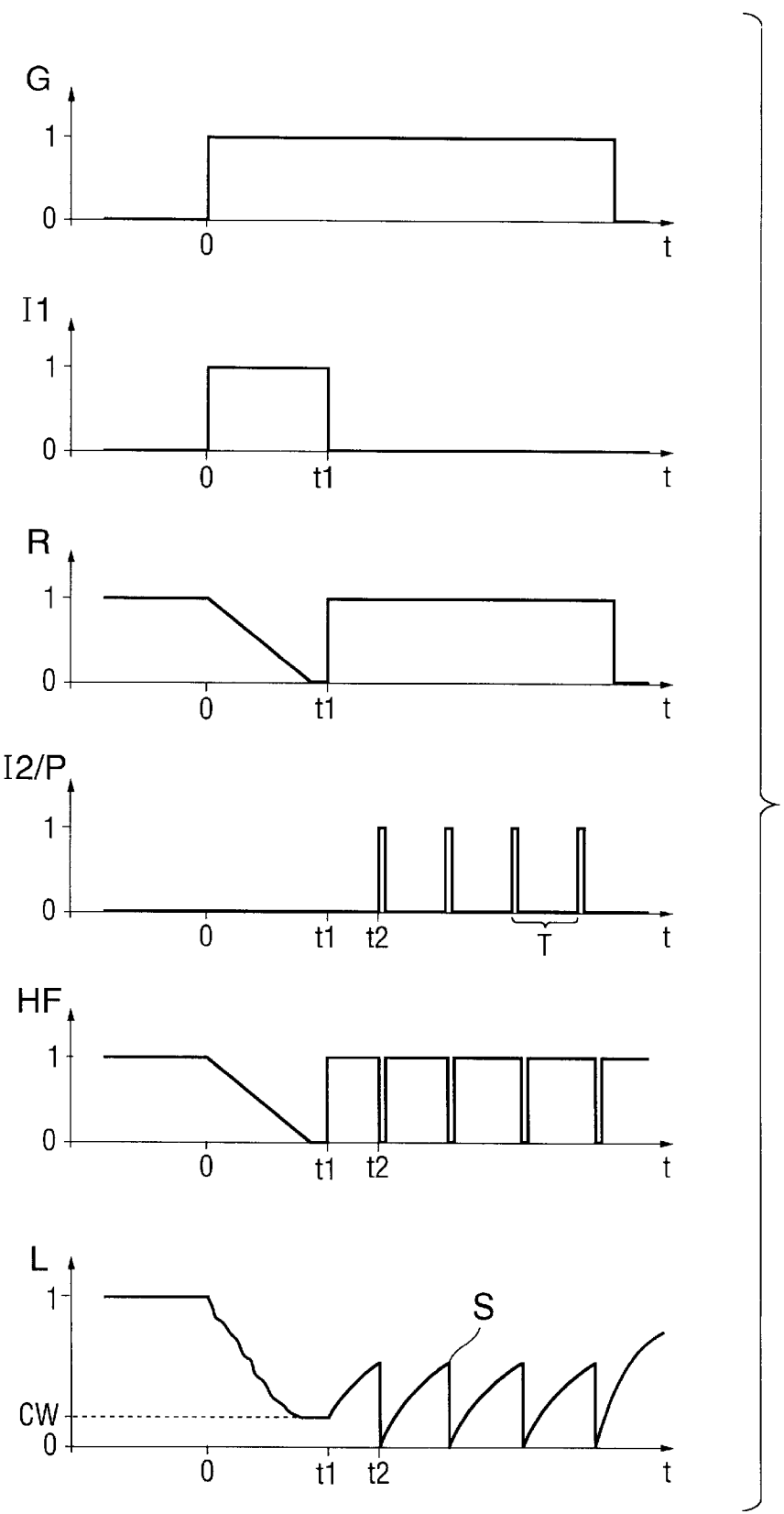
FIG. 9 is a timing diagram graphically, schematically illustrating the relationship of control signals of the first-pulse controller of FIG. 8 in a fifth embodiment of the present invention.

Referring now to FIG. 9, the temporal relationship of signals G, I1, R, I2/P, HF and L in the fifth embodiment of a pulsed-laser in accordance with the present invention are next discussed. Gate signal G changes at time point t=0 from 0 to 1 and, later, changes again to 0. While gate signal G is switched to 1, pulsed-laser 50 is set to the pulse-drive mode. Signal I1 switches to 1 from time t=0 to time t=t1. The time from 0 to t1 is the first time-interval. Integrator 57 creates from signal I1 a signal R that, from time point t=0, falls rampwise from 1 to 0. Shortly before time t1 it reaches a value of 0, and at time t1 jumps again to a value of 1. Signal I2/P is, until time t2, at 0. The time between t1 and t2 is the second time-interval. From time t2, signal I2/P exhibits short pulses with a temporal separation T which corresponds to the inverse value of the pulse-repetition frequency. Signal HF, which controls Q-switch 26, has a form which results from a combination of signals R and I2/P. At t=0, signal HF falls rampwise from 1 to 0, at t1 it jumps to 1 and from t2 it changes pulsewise between 1 and 0. With the pulsewise progress of signal HF the laser-pulses are triggered. In the lowermost graph of FIG. 9, the energy L in gain-medium 24 is depicted. At t=0 the energy L falls, through pre-lasing, from its maximum value (here equal to 1) irregularly to the value cw which corresponds to the value that the laser would have in CW operation. At time t1, the energy has stabilized at the value cw. From t1 to t2, the second time-interval runs, during which the energy in the gain-medium is again built up. The length of the second time-interval is selected such that the energy at time t2 very precisely reaches the peak energy value S which will exist during the pulse-drive mode of the inventive pulsed-laser. During the pulse-drive mode, the energy falls with each pulse delivered very quickly to almost 0 and then builds up again to the peak value S. After termination of pulse-drive mode, the energy in the gain-medium builds up again to its saturation value.

Figure 10:
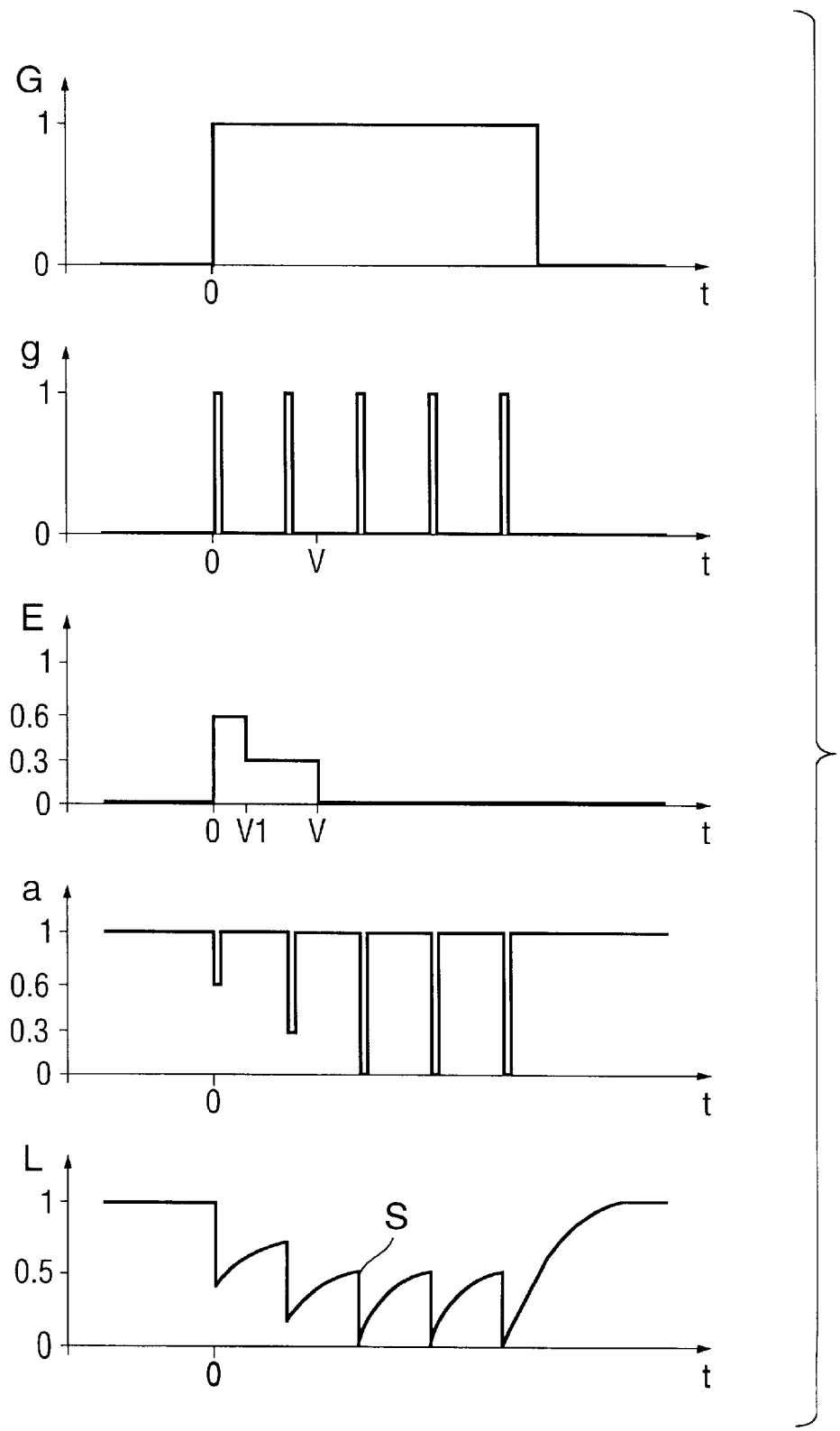
FIG. 10 is a timing diagram graphically, schematically illustrating the relationship of control signals of the first-pulse controller of FIG. 2 in a sixth embodiment of the present invention.

FIG. 10, depicts the temporal relationship of signals G, g, E, a and L in a sixth embodiment of a pulsed-laser in accordance with the present invention. This embodiment is preferably implemented according to the arrangements of FIG. 1 and FIG. 2. Signals A and P (not shown) are set continuously at 1. At the instant of switching the pulsed-laser from the ready-mode to the pulse-drive mode, at t=0 signal E is raised from 0 to a first limiting-value, for example 0.6. Signal E, can also have this value constantly during the ready-mode of the pulsed-laser. At time t=V1, which occurs before the trigger time of the second laser-pulse, E is reduced to a second limiting-value, for example 0.3. From time point t=V, which occurs before the trigger time of the third laser-pulse, the Q-switch control signal goes from 1 to 0.6 during the first trigger pulse (signal g), to 0.3 during the second trigger pulse and to 0 during the remaining trigger pulses. As Q-switch 26 is only partially transmissive during the first two trigger pulses, the energy L in gain-medium 24 is only partially depleted. The limiting values (E=0.6, and E=0.3 in this example) are set by the first-pulse controller such that the energy in all pulses is about the same.

Figure 11:
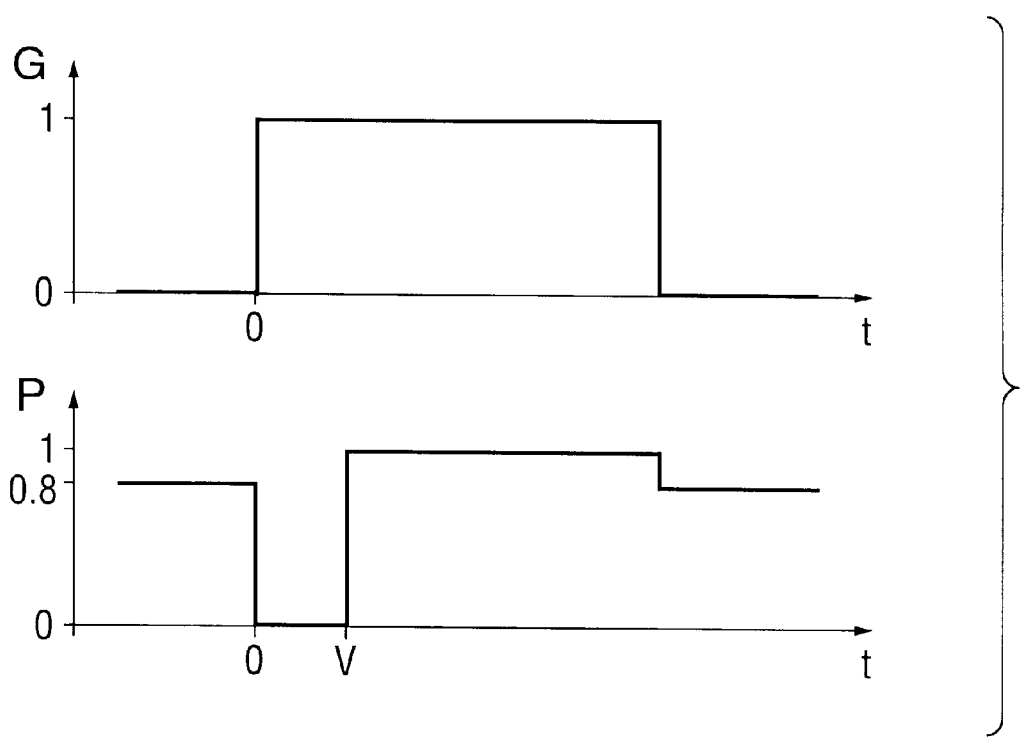
FIG. 11 is a timing diagram graphically, schematically illustrating the relationship of control signals of the first-pulse controller of FIG. 8 in a seventh embodiment of the present invention.

FIG. 11, depicts the temporal relationship of signals G and P in the seventh embodiment of a pulsed-laser in accordance with the present invention. This embodiment is exemplified as a variation of the above-described third embodiment, the temporal relationship of signals of which is depicted in FIG. 5. During the ready-mode of the pulsed-laser, pump-power P is reduced to 0.8. From t=0 to t=V, P is reduced to 0, and during the remaining time in the pulse-drive mode P is set to 1, i.e., full pump-power is used. Through the reduction of pump-power during the ready-mode, a constant energy-absorption in the gain-medium and, accordingly, a constant operating-temperature of the pulsed-laser is achieved.

What is claimed is:

1. A pulsed-laser, comprising:
   a laser resonator including a gain-medium and a Q-switch for generating laser pulses;
   a pump-light source for energizing said gain-medium;
   said Q-switch having an on-mode in which the Q-switch is substantially transparent, and an off-mode in which the Q-witch is substantially opaque;
   a gate-signal source cooperative with said Q-switch and providing a gate-signal for switching the laser between a ready-mode in which no pulses are generated and a pulse-drive mode in which pulses are generated; and
   a first-pulse controller for controlling the energy in a first of a series of pulses generated by the laser, said first-pulse controller operative to increase transmission of said Q-switch to a limiting value at which pre-lasing of the laser takes place, the intensity of the pre-lasing being such that, immediately before switching of the laser from the ready-mode to the pulse-drive mode, energy in said gain-medium is substantially at a level equal to a peak-level which is reached during the pulse drive-mode of the laser so that the energy of the first pulse generated in the series does not differ significantly from the successive pulses in the series.

2. The pulsed-laser of claim 1, wherein the transmission of said Q-switch in its off-mode is at the limiting value during the ready-mode and the pulse-drive mode of the laser.

3. The pulsed-laser of claim 1, wherein the transmission of said Q-switch in the off-mode thereof is raised only during the ready-mode of the laser.

4. The pulsed-laser of claim 1, wherein the limiting value of the Q-switch transmission is selected based on the pulse-energy and pulse-repetition rate of the laser.

5. A pulsed-laser, comprising:
   a laser resonator including a gain-medium and a Q-switch for generating laser pulses;
   a pump-light source for energizing said gain-medium;
   said Q-switch having an on-mode in which the Q-switch is substantially transparent, and an off-mode in which the Q-switch is substantially opaque;
   a gate-signal source cooperative with said Q-switch and providing a gate-signal for switching the laser between a ready-mode in which no pulses are generated and a pulse-drive mode in which pulses are generated; and
   a first-pulse controller for controlling the energy in a first of a series of pulses generated by the laser, said first-pulse controller operative such that (a) during the ready-mode of the pulsed-laser said Q-switch is substantially opaque, (b) and when the pulsed laser switches from the ready-mode to the pulse-drive mode, the transmission of said Q-switch is raised, (c) and wherein the triggering of said first pulse following said switching of the pulsed laser from the ready-mode to the pulse-drive mode is delayed for a selectable delay-period, said delay-period being selected to be sufficiently long that energy in said-gain-medium falls within said delay-period to a peak level which is reached during the pulse-drive mode, and (d) from the end of said delay-period until switching the pulsed laser back to the ready-mode, transmission of said Q-switch in its off-mode is adjusted to be substantially opaque so that the energy of the first pulse generated in the series does not differ significantly from the successive pulses in the series.

6. The pulsed-laser of claim 5, wherein said first-pulse controller is further arranged such that the rate of rise of said Q-switch transmission is selectively adjustable.

7. The pulsed-laser of claim 5, wherein the delay-period is selected based on the selected pulse-repetition frequency, the pulse-energy, and the rate of rise of transmission of said Q-switch.

8. A pulsed-laser, comprising:
   a laser resonator including a gain-medium and a Q-switch for generating a laser beam;
   a pump-light source for energizing said gain-medium;
   said Q-switch having an on-mode in which the Q-switch is substantially transparent, and an oft-mode in which the Q-switch is substantially opaque;

a gate-signal source cooperative with said Q-switch and providing a gate-signal for switching the laser between a ready-mode in which no pulses are generated and a pulse-drive mode in which pulses are generated; and a first-pulse controller for controlling the energy in a first of a series of pulses generated by the laser, said first-pulse controller operative such that (a) at the instant of switching the pulsed-laser from the ready-mode to the pulse-drive mode the pump-power is reduced to a limiting value at which losses in the laser exceed the pump-power (b) the triggering of the first pulse after the instant of switching the pulsed-laser from the ready-mode to the pulse-drive mode is delayed for a predetermined delay-period V+T where T is the temporal-separation of pulses in the series of pulses, the value of V being sufficiently long that within time V the energy in said gain-medium falls to zero, and (c) at the end of time V the pump-power is raised to full-power so that the energy of the first pulse generated in the series does not differ significantly from the successive pulses in the series.

9. The pulsed laser of claim 8 wherein said limiting value is between about 0% and 30% of full power.

10. A pulsed-laser, comprising:

a laser resonator including a gain-medium and a Q-switch for generating a laser beam;

pump-light source for energizing said gain-medium;

said Q-switch having an on-mode in which the Q-switch is substantially transparent, and an off-mode in which the Q-switch is substantially opaque;

a gate-signal source cooperative with said Q-switch and providing a gate-signal for switching the laser between a ready-mode in which no pulses are generated and a pulse-drive mode in which pulses are generated; and a first-pulse controller for controlling the energy in a first of a series of pulses to be generated by the laser, said first-pulse controller operative such that after switching the laser to the pulse-drive mode, the transmission of the Q-switch is increased during a first time-interval so that the energy in said gain-medium is depleted to a start-value which corresponds to the value that would exist in CW operation of the laser, and in a second time interval, immediately following said first time interval, said gain-medium is energized to a peak level which is reached during the pulse-drive mode, and at the end of the second time interval the first laser-pulse is generated so that the energy of the first pulse generated in the series does not differ significantly from the successive pulses in the series.

11. The pulsed-laser of claim 10, wherein the length of said first time-interval and/or the rate of increase of transmission of said Q-switch is selected such that the energy in said gain-medium is depleted to said start-value at the end of the first time interval.

12. The pulsed-laser of claim 10, wherein the length of said first time-interval is selected such that the energy in said gain-medium is depleted to said start-value at least about 5% before the end of the first time interval.

13. The pulsed-laser of claim 10, wherein the length of said second time-interval is 80% of the temporal separation of pulses in the pulse-series.

14. The pulsed laser of claim 10, wherein the length of said second time interval is selected based on the temporal separation of pulses in the pulse-series, the pulse-energy and the pump-light power.

15. The pulsed laser of claim 10 wherein the sum of the lengths of said first and second time intervals can be predetermined.

16. A pulse-laser, comprising:

a laser resonator including a gain-medium and a Q-switch for generating laser pulse;

a pump light source for energizing said gain medium;

said Q-switch having an on-mode in which the Q-switch is substantially transparent, and an off-mode in which the Q-switch is substantially opaque;

a gate-signal source cooperative with said Q-switch and providing a gate-signal for switching the laser between a ready-mode in which no pulses are generated and a pulse-drive mode in which pulses are generated; and a first-pulse controller for controlling the energy in a first of a series of pulses to be generated by the laser, said first-pulse controller operative such that from the instant of switching the pulsed-laser from the ready-mode to the pulse-drive mode, for a predetermined time-interval the transmission of said Q-switch in the on-mode thereof is reduced to a limiting-transmission selected such that the first pulse of a pulse-series delivered following said switching of the pulsed-laser from the ready-mode to the pulse-drive mode has substantially the same energy as subsequent pulses in said pulse-series.

17. The pulsed-laser of claim 16, wherein said first-pulse controller is further operative such that during said predetermined time interval the limiting-transmission of said Q-switch is raised from a selectable minimum value thereof to the maximum value thereof.

18. The pulsed-laser of claim 16, wherein the transmission level of the Q-switch during the predetermined time interval is selected based on the values of the pulse-energy and pulse-repetition rate of the laser.

* * * * *